United States Patent [19]

Shigemori

[11] Patent Number: 5,235,576
[45] Date of Patent: Aug. 10, 1993

[54] OPTICAL DISC APPARATUS

[75] Inventor: Toshihiro Shigemori, Machida, Japan

[73] Assignee: Ricoh Company, Ltd., Tokyo, Japan

[21] Appl. No.: 834,171

[22] Filed: Feb. 11, 1992

[30] Foreign Application Priority Data

Feb. 15, 1991 [JP] Japan .................................. 2-42342

[51] Int. Cl.$^5$ ..................... G11B 17/22; G11B 7/00
[52] U.S. Cl. ..................................... 369/32; 369/44.26
[58] Field of Search ............. 369/32, 44.26, 13, 275.3,
369/44.13, 44.14, 275.1, 33, 54, 44.25, 44.28,
44.41, 109, 44.34, 48, 50; 360/77.02, 77.08

[56] References Cited

U.S. PATENT DOCUMENTS

| | | | |
|---|---|---|---|
| 3,869,193 | 3/1975 | Schmit | 350/6 |
| 4,118,734 | 10/1978 | Bouwhuis et al. | 358/128 |
| 4,403,318 | 9/1983 | Nagashima et al. | 369/100 |
| 4,564,929 | 1/1986 | Yonezawa et al. | 369/44 |
| 4,566,088 | 1/1986 | Yoshida et al. | 369/44 |
| 4,700,336 | 10/1987 | Yoshida et al. | 369/44 |
| 4,710,909 | 12/1987 | Tsuyoshi et al. | 369/46 |
| 4,718,053 | 1/1988 | Sato et al. | 369/44 |
| 4,751,695 | 6/1988 | Kaku et al. | 369/46 |
| 4,843,601 | 6/1989 | Eguchi et al. | 369/44.26 |
| 4,953,150 | 8/1990 | Sonobe | 369/13 |
| 4,961,178 | 10/1990 | Matsuda et al. | 369/103 |
| 4,967,403 | 10/1990 | Ogawa et al. | 369/44.26 |
| 4,980,879 | 12/1990 | Yamada et al. | 369/100 |
| 5,023,857 | 1/1991 | Verboom | 369/44.25 |
| 5,031,166 | 7/1991 | Getreuer et al. | 369/44.26 |
| 5,060,214 | 10/1991 | Nakayama et al. | 369/44.26 |
| 5,063,546 | 11/1991 | Ito et al. | 369/32 |
| 5,077,716 | 12/1991 | Takeda et al. | 369/32 |
| 5,099,467 | 3/1992 | Sumihiro et al. | 369/44.26 |
| 5,128,916 | 7/1992 | Ito et al. | 369/44.26 |

FOREIGN PATENT DOCUMENTS 3827667 2/1989 Fed. Rep. of Germany .

Primary Examiner—Robert J. Pascal
Assistant Examiner—Ali Neyzari
Attorney, Agent, or Firm—Cooper & Dunham

[57] ABSTRACT

An optical disc apparatus for use with an optical disc including on its tracks pairs of servo pattern areas to be recorded with an address pit pattern by using data patterns, each of which indicates a relative track number of the recording track, being repeated in a predetermined cycle; the servo area comprising a pair of wobble pits each being disposed off the center of the recording track in opposite direction with one another, a clock pit disposed on the center of the track and address pit pattern consisting of a plurality of pits disposed on the center of the recording track for indicating relative track number;

an optical pick-up device;

a relative address detection means to identify the relative track number of the track to which the optical pick-up is accessing and for outputting detected relative address signal; and an address/speed detection means for receiving the relative address signal outputted by the relative address detection means, and detecting an absolute track number of the track to which the optical pick-up is accessing and a travel speed of the optical pick-up device moving across the recording tracks.

14 Claims, 13 Drawing Sheets

Fig. 9

| Sn' \ Sn | 0 | 1 | 2 | 3 |
|---|---|---|---|---|
| 0~0.5 | Sn – Sn' | Sn – Sn' | 0 | Sn–(Sn'+4) |
| 0.5~1.5 | Sn – Sn' | Sn – Sn' | Sn – Sn' | 0 |
| 1.5~2.5 | 0 | Sn – Sn' | Sn – Sn' | Sn – Sn' |
| 2.5~3.5 | (Sn+4)–Sn' | 0 | Sn – Sn' | Sn – Sn' |
| 3.5~ | (Sn+4)–Sn' | (Sn+4)–Sn' | 0 | Sn – Sn' |

OPTICAL DISC APPARATUS

BACKGROUND OF THE INVENTION

1. Field of the Invention

The present invention relates to an optical disc apparatus controlling tracking by the sampling servo system.

2. Description of the Related Art

In the art of the system in which an optical recording medium is used as the recording medium, such as, for example, a magneto-optical disk apparatus, an optical disc apparatus etc. (to be generically termed as optical disc apparatus hereinafter), there are provided some kind of tracking systems for trailing tracks formed on an optical recording medium by the laser beam of an optical pick-up device for recording data on, and/or regenerative data from, an optical recording medium. One of the systems is constructed by a continuous servo method in which a guide slot for the laser beam is formed, whereas as another system, there is a sampling servo method in which servo patterns are recorded on the mirror-finished recording medium for the purpose of detecting the positional errors of the laser beam. In addition, some variations of these servo methods are being brought into practice.

As an reference example of the sampling servo system, a disclosure has been made in Japanese Patent Application Laying-open No. 243241/1989. In this conventional system, there are provided on each servo field of an optical recording medium a wobble pit pair for the detection of the tracking error signal, a clock pit for the detection of timing and address pit section for detecting the address of a recording track. One pattern of the address pit section has a 12-digit length and there are 28 patterns, which are allotted respectively to different individual tracks, cyclically being repeated by the same pattern after every 28 tracks.

Thus, the patterns of address pit section are cyclically repeated in every 28 tracks, so that in finding or identifying the destination address of a recording track by referring these patterns for an address pit section, the optical pick-up can move to a following servo field to be read out on any recording track located within 27 tracks from the track before the movement.

Accordingly, it is possible for the optical pick-up of the system of this example to move from the starting recording track to a recording track located within 27 tracks apart, with the time taken for the optical disc to be turned from one servo field to a next servo field. As a result, the optical pick-up can be moved at a high speed, thus making it possible to shorten the time for a data access.

However, thus configurated system has drawbacks as follows.

Specifically, when the travel speed of the optical pick-up device is intended to improve in order to shorten the time taken for a data access, this requires increase in the number of the patterns for the address pit section. To achieve this, it is necessary to increase in the number of the digits of the address pits in a pattern, so that the data length in the servo field becomes long, resulting disadvantageously in a reduction of the data storing capacity for one optical disc.

On the other hand, when the number of digits of an address pit sectional pattern in the servo filed is to be reduced in order to increase the data storing capacity for one optical disc, the kinds of the patterns for the address pit section are decreased. Consequently, as a result, the travel speed of the optical pick-up is required to be low, thus giving rise to an inconvenience that the time taken for a data access becomes lingered.

SUMMARY OF THE INVENTION

It is therefore an object of the present invention to provide an optical disc apparatus with which the data recording capacity for an optical disc can be increased and in which the optical pick-up device improved in its travel speed.

The object of the invention can be achieved by an optical disc apparatus with an optical disc as a recording medium which is provided at predetermined intervals with a number of tracks on its mirror-finished surface, comprising:

an optical disc disposed on a turn table, including on its tracks a number of pairs of a servo pattern area to be recorded with an address pit pattern by using data patterns, each of which indicates a relative track number of the recording track, being repeated in a predetermined cycle and a user data area next to the servo pattern area to be recorded with user data; the servo area comprising a pair of wobble pits each being disposed off the center of the recording track in opposite direction with one another, a clock pit disposed on the center of the track and address pit pattern consisting of a plurality of pits disposed on the center of the recording track for indicating relative track number;

an optical pick-up device for recording data on, and-/or regenerating data from, the optical disc by means of a laser beam;

a relative address detection means for detecting the address pit pattern based on regenerative signal from the optical pick-up device so as to identify the relative track number of the track to which the optical pick-up is accessing and for outputting detected relative address signal; and an address/speed detection means for receiving the relative address signal outputted by the relative address detection means, and detecting an absolute track number of the track to which the optical pick-up is accessing and a travel speed of the optical pick-up device moving across the recording tracks.

Accordingly, the integrated value of the number of the relative track varies following the real access position of the optical pick-up device. Therefore, even in the case where the travel speed of the optical pick-up device becomes larger than the value corresponding to the number of digits of the address pit pattern, it is possible to properly identify the address of the recording track to which the optical pick-up is accessing. This makes it possible to reduce the number of digits for the address pit pattern, improve the data memory capacity for one optical disc and increase the travel speed of the optical pick-up device.

As is described above, the advantage of the present invention lies in that, since, the integrated value of the number of the relative track varies following the real access position of the optical pick-up device, even in the case where the travel speed of the optical pick-up device becomes larger than the value corresponding to the number of digits of the address pit pattern, it is possible to properly identify the address of the recording track to which the optical pick-up is accessing, and whereby making it possible to reduce the number of digits for the address pit pattern, improve the data memory capacity for one optical disc and increase the travel speed of the optical pick-up device.

Further objects and advantages of the present invention will be apparent from the following description of the preferred embodiments of the invention as illustrated in the accompanying drawings.

BRIEF DESCRIPTION OF THE DRAWINGS

FIG. 9 is a table for showing an example of the operational logic in a comparator;

DESCRIPTION OF THE PREFERRED EMBODIMENTS

The embodiment of the present invention will be in detail described with reference to accompany drawings.

Figure 1:
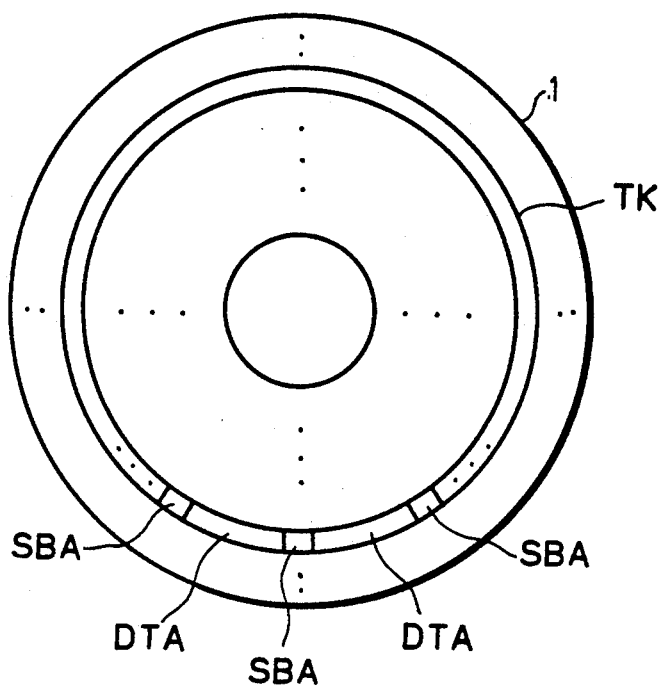
FIG. 1 is a schematic view showing an example of a track arrangement of a magneto-optical disk of an embodiment according to the present invention.

FIG. 1 shows a magneto-optical disk applied to the embodiment of the present invention.

Figure 2:
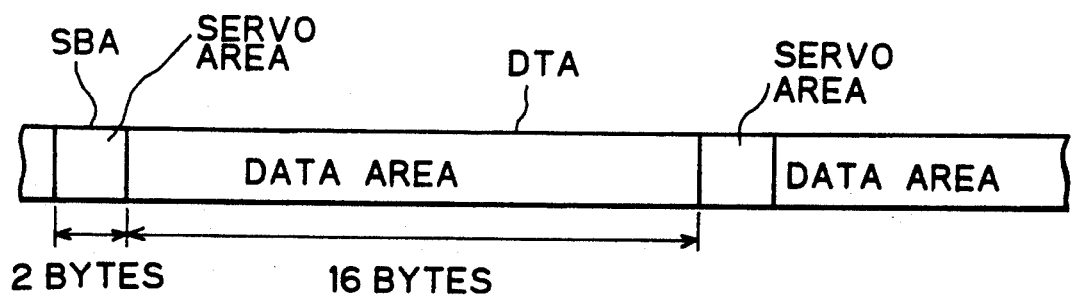
FIG. 2 is a schematic view showing an example of an arrangement of servo patterns.

This magneto-optical disk is formed with recording tracks TK consisting of concentric circles at intervals of a predetermined pitch, being driven in a constant angular velocity. On the recording track TK, there are provided as shown in FIG. 2, a large number of blocks each consisting of a servo area SBA having 2 bytes in its length for sampling servo and a data area DTA having 16 bytes in its length.

Figure 3:
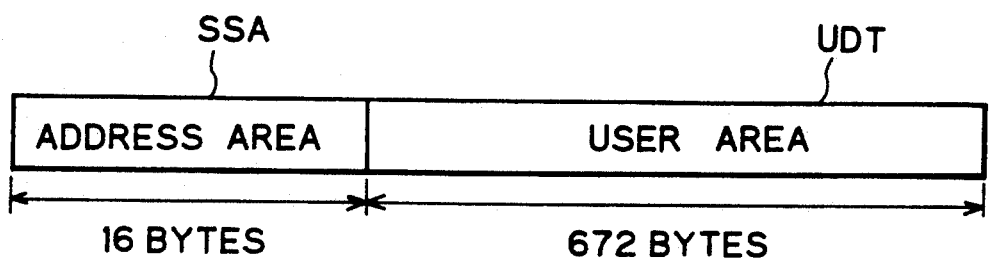
FIG. 3 is a schematic view showing an example of a data format of a sector.

With regard to one recording track, the data area DTA is divided into sectors with a predetermined length in a predetermined number (for example, 32 sectors). Each sector is composed of 43 blocks consisting of, as shown in FIG. 3, an address area SSA' (having, for example, 16 bytes) for identification and a user data area UDT having a predetermined data length (for example, 672 bytes). Here, in this example, one recording track includes 1376 blocks.

Figure 4:
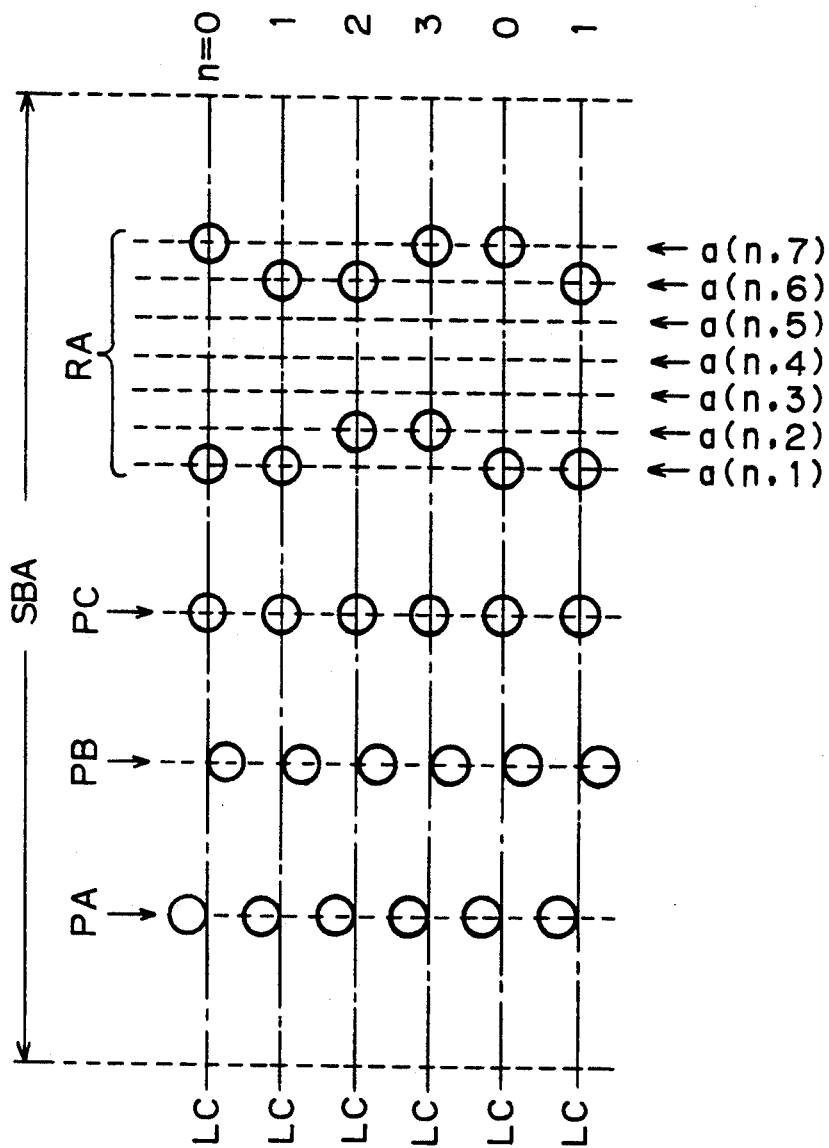
FIG. 4 is a schematic view showing an example of a servo area.

As shown in FIG. 4, each servo area SBA is written in with a wobble pit pair of PA and PB, a clock pit PC and an address pit section RA including two pits (mark and datum 1). Here a wobble pit pair of PA and PB are positioned slantwise in opposite directions, contacting their respective contours with the center line LC of the recording track TK, while the clock pit PC and the pits in the address pit section RA being arranged such that the centers thereof correspond to the center line LC of the recording track TK.

With regard to the address pit section RA, there are four patterns each of which is to display a relative track address, having seven digits in its length with its two pit being disposed keeping a space of three digits or more in order to avoid the interference between the codes in adjacent recording tracks.

In this case, when the value of the relative track address n is "0", the corresponding pattern thereto is formed with two pits at the digits a(n, 1) and a (n, 7). The pattern corresponding to the value of the relative track address n being "1" is formed with two pits at the digit a (n, 1) and a (n, 6). The pattern corresponding to the value of the relative track address n being "2" is formed with two pits at the digit a (n, 2) and a (n, 6). Likewise, the pattern corresponding to the value of the relative track address n being "3" is formed with two pits at digit a (n, 2) and a (n, 7).

In relation to regenerative signals (described hereinafter) for an optical pick-up device (not shown), a detection of a tracking error of the laser beam spot (not shown) of the optical pick-up device is made based on the regenerative levels of timings of the wobble pit pair PA and PB, and on the basis of the detected tracking error, a tracking servo control is to be made so that the laser beam spot may correspond to the center line LC of the recording track TK.

On the other hand, a phase control of a sampling clock (described hereinafter) for sampling a regenerative signal RF is made based on the regenerative level of the timing of the clock pit PC.

Meanwhile, at a time between the wobble pit pair PA and PB, and the clock pit PC, made a detection of the focusing error of the laser beam spot of the optical pick-up device, and whereby based on the detected focusing error, a focusing servo control is made so that the laser beam spot may be focused on the recording track TK.

Figure 5:
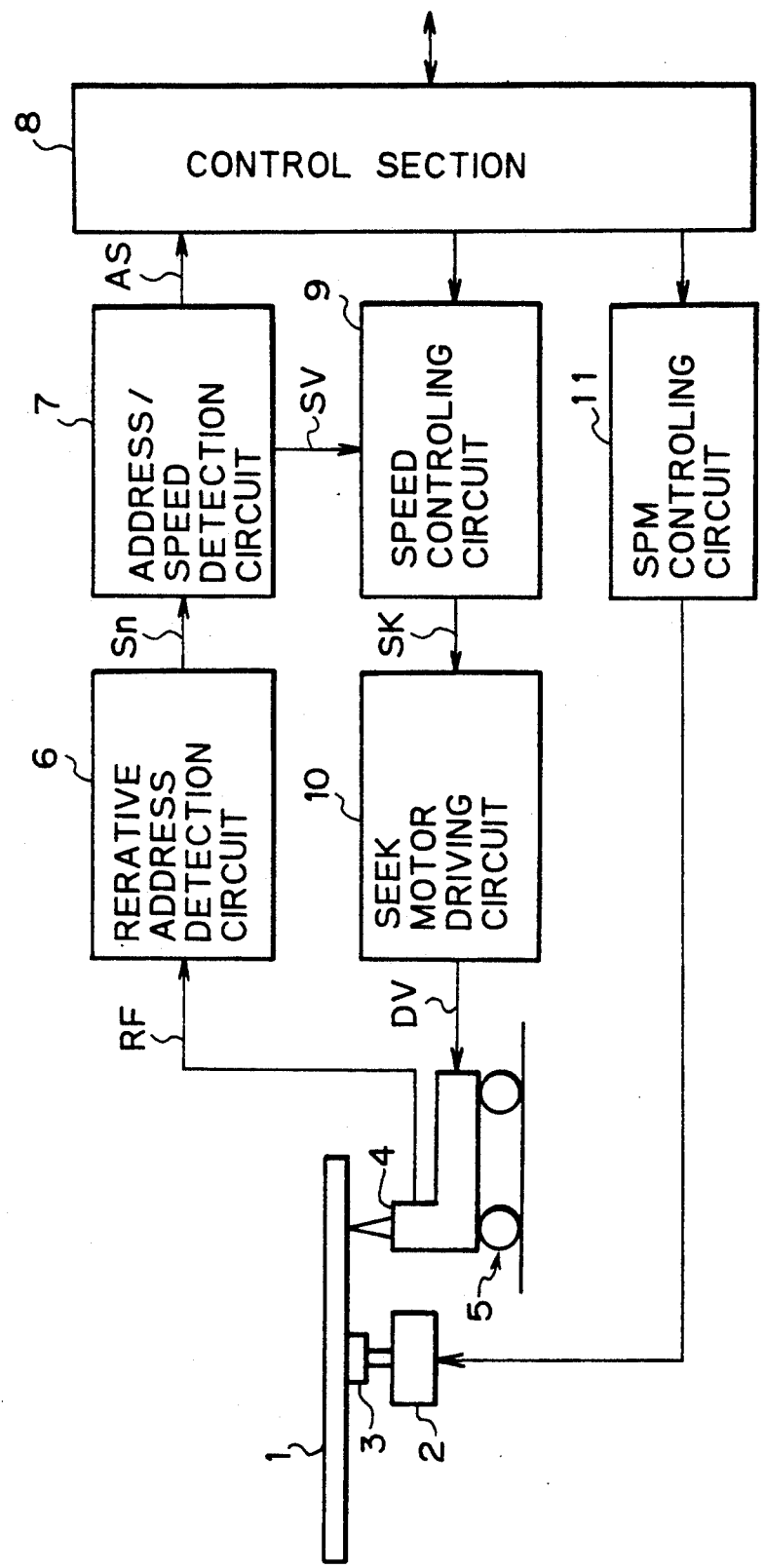
FIG. 5 is a block diagram showing as example main parts of a control system in a magneto-optical disk apparatus.

FIG. 5 shows an example of a magneto-optical disc apparatus using a magneto-optical disc 1 as the recording medium. In this figure, only the parts mainly relating to the present invention are shown and the other parts are being omitted.

In FIG. 5, a magneto-optical disk 1 which is loaded by means of a loading mechanism (not shown), is mounted on a turning table 3 which is connected fixedly to a shaft of a spindle motor 2. Recording/regeneration of the data on the optical disc 1 is performed by means of an optical pick-up device 4, which being mounted on a seek motor 5, can travel both inward and outward in the radial direction of the magneto-optical disk 1.

When picking up recorded information from the magneto-optical disk 1, the optical pick-up device 4 outputs a regenerative signal RF, which in turn is inputted to a relative address detection circuit 6. The relative address detection circuit 6 is to identify the relative address n of a detected address pit section RA, and the identified resultant is, as a relative track address signal Sn, inputted to an address/speed detection circuit 7.

The address/speed detection circuit 7 is provided to detect, based on the relative track address signal Sn, a speed signal SV representing the travel speed of the optical pick-up device 4, and an address signal AS representing the absolute address at which the optical pick-up device 4 is being positioned. Thus detected address signal AS is inputted to a control section 8, and the speed signal SV is being inputted to a speed controlling circuit 9.

The control section 8 is to control the whole operation of the magneto-optical apparatus, and to exchange various data with a host system, keeping on sending commanding signals to the speed controlling circuit 9 till the value of the address signal AS corresponds to the recording address of destination. In addition, the control section 8 also governs the operation of the spindle motor control section 11 which controls the spindle motor 2.

The speed controlling circuit 9 is to form a speed commanding signal SK for moving the seek motor 5 based on the inputted speed signal SV and a moving direction designated by the control section 8. Thus formed speed commanding signal SK is inputted to a seek motor driving circuit 10.

The seek motor driving circuit 10 forms a driving signal DV for driving the seek motor 5 at the designated speed and in the designated direction by the speed commanding signal SK. Thus formed driving signal DV is inputted to the seek motor 5.

Figures 6A, 6B:
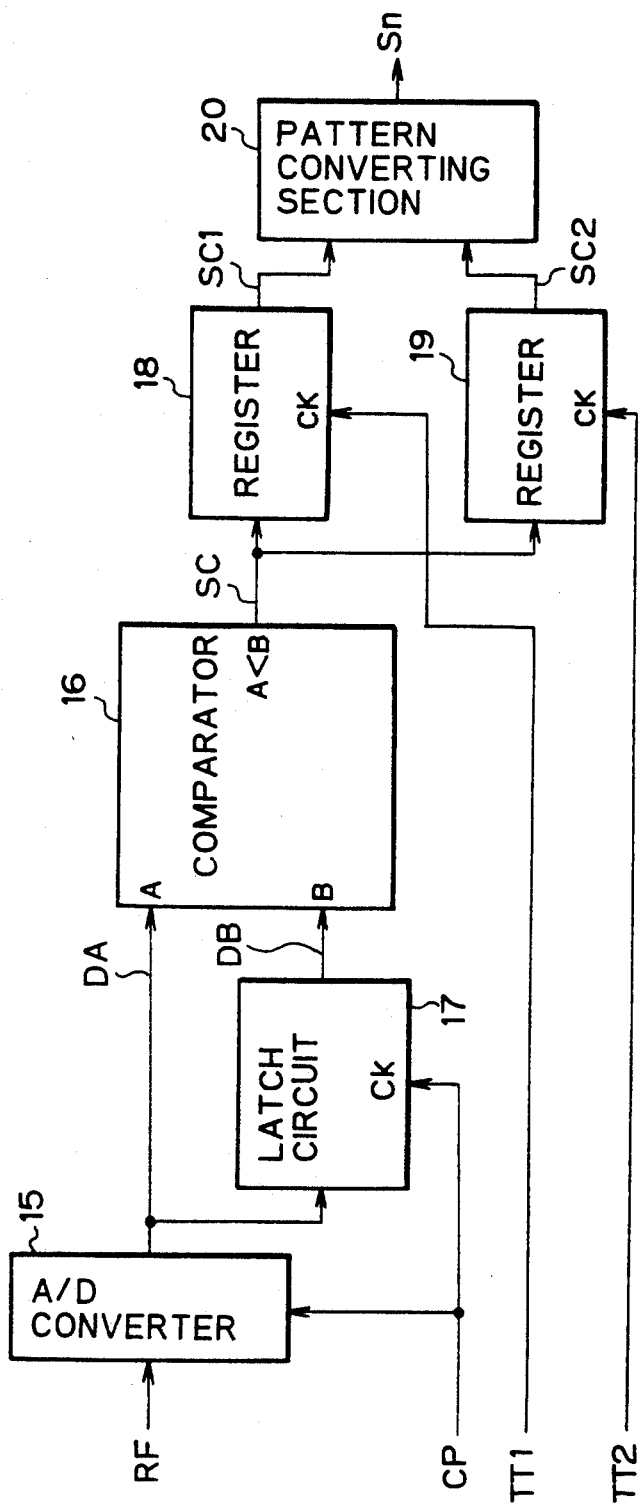
FIGS. 6(a)-6(b) is a block diagram showing an example of a relative address detection circuit.

FIG. 6(a) shows an example of the relative addressing circuit 6.

In this figure, an analog-to-digital converter 15 samples the regenerative signal RF in time with the sampling clock CP, and converts thus sampled value into a corresponding digital data constructed of predetermined bits. The converted result is, as a digital signal DA, inputted to a comparator 16 at its input terminal A, and to a latch circuit 17.

The latch circuit 17 is to pick up the digital signal DA in synchronization with the sampling clock CP and retain it. The output data from the latch circuit 17 is inputted as a signal DB to the comparator 16 at its input terminal B.

The comparator 16 compares the signal DA inputted from the input terminal A with the signal DB inputted from the input terminal B. In this comparison, when the signal DB is larger than the signal DA, the comparator 16 raises its output signal SC to the logical H level, and this signal SC is inputted into resisters 18 and 19.

The resister 18 picks up and retains the value of the signal SC at time when a timing signal TT1 is inputted, and sends its output data, namely a signal SC1, to a pattern conversion section 20.

The resister 19 picks up and retains the value of the signal SC at time when a timing signal TT2 is inputted, and sends its output data, namely a signal SC2, to the pattern conversion section 20.

The pattern conversion section 20 identifies the relative track address n based on the logical state of the signals SC1 and SC2, following the feature shown in FIG. 6(b). Thus identified result is send out as the relative track address signal Sn.

Here, the sampling clock CP and the timing signals TT1 and TT2 are generated by external circuits not shown, and inputted to the relative address detection circuit 6.

Figure 7:
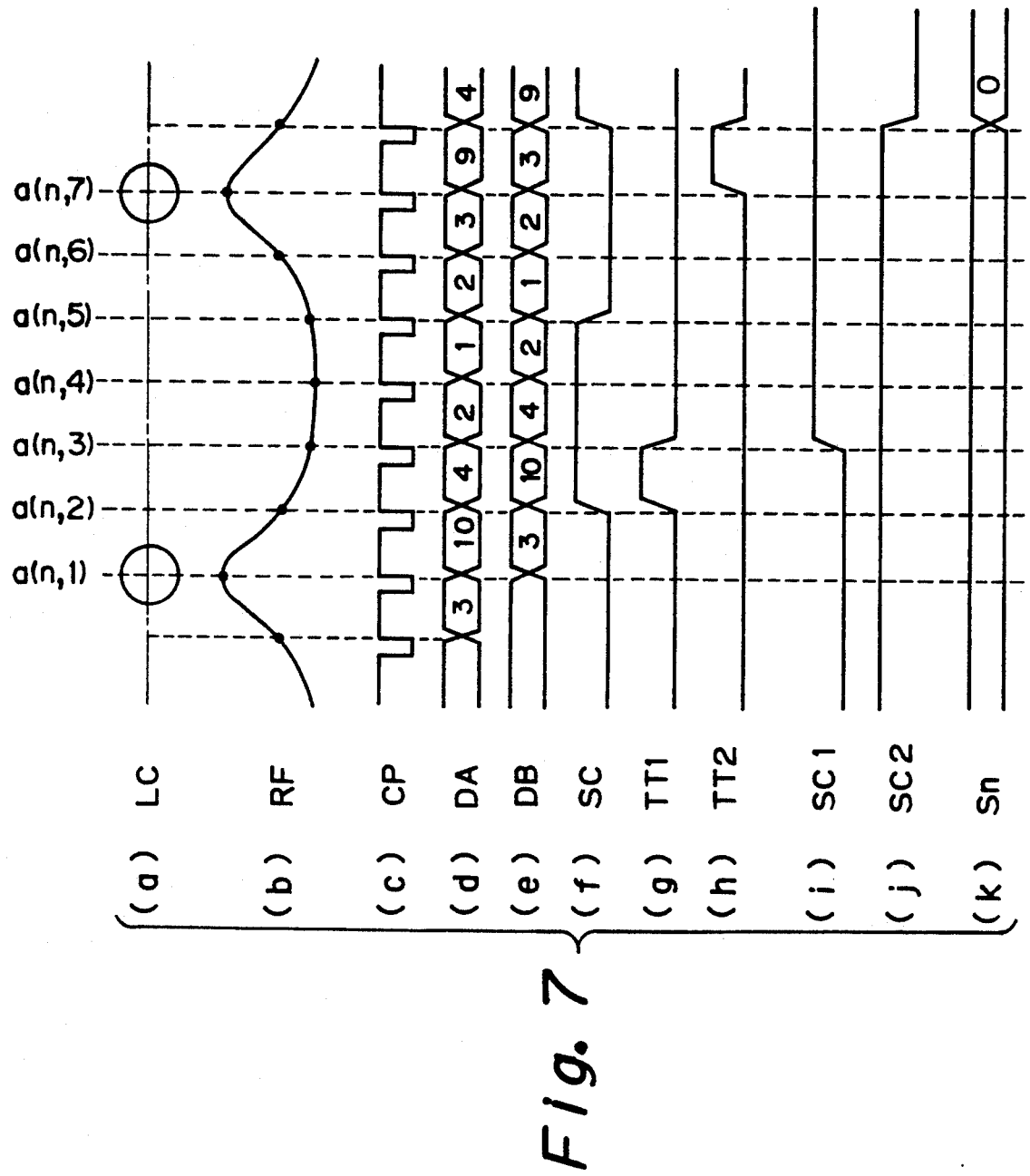
FIGS. 7(a)-7(k) is a diagram showing operational signal waveforms for explaining the operation of the circuit shown in FIG. 6.

As shown in FIG. 7(a), for example, if a piked-up address pit section RA indicates a value "0" as the relative address n, a regenerative signal RF as shown in FIG. 6(b) is inputted.

The sampling clock CP is inputted in synchronization with every bit in the address pit section RA as shown in FIG. 7(c). In this state, during the interval from the one bit before the first bit of the address pit section RA to the first bit next to the last bit of the address pit section RA, the value of the signal DA sent out from the analog-to-digital converter 15 varies "3", "10", "4", "2", "1", "2", "3", "9" and "4" in this order. (Refer to FIG. 7(d)).

Accordingly, the signal DB sent out from the latch circuit 17 varies from the first bit of the address pit section RA to the first bit next to the last bit of the address pit section RA, "3", "10", "4", "2", "1", "2", "3", and "9" in this order. (Refer to FIG. 7(e)).

The comparator 16 compares the value of the signal DA with that of the signal DB. Consequently when the signal DB is larger than the signal DA, the comparator 16 raises its output signal SC to the logical H level, so that in this case, as shown in FIG. 7(g), the signal SC gets raised to the logical H level in the duration of the second, third and fourth bits of the address pit section RA, and in the duration of the first bit next to the last bit for the address pit section RA.

The timing signal TT1 is outputted at the second bit of the address pit section RA (refer to FIG. 7(g)), whereas the timing signal TT2 is outputted at the first bit next the last bit of the address pit section RA (refer to FIG. 7(h)). Accordingly, the stored value in the register 18 is set at the logical H level, and consequently, the signal SC1 takes the value of the logical H level (refer to FIG. 7(i)). On the other hand the stored value in the register 19 is set at the logical L level, and consequently, the signal SC2 takes the value of the logical L level (refer to FIG. 7(j)).

As a result, the value of the relative track address signal Sn, which is outputted from the pattern conversion section 20 at the time when the first bit starts after the last bit of the address pit section RA, is set at "0", to thereby obtain the relative track address n of the recording track read out by the optical pick-up device 4.

As detailed above, it is possible to detect the relative track address n properly by means of the relative simple circuit configuration.

Figure 8:
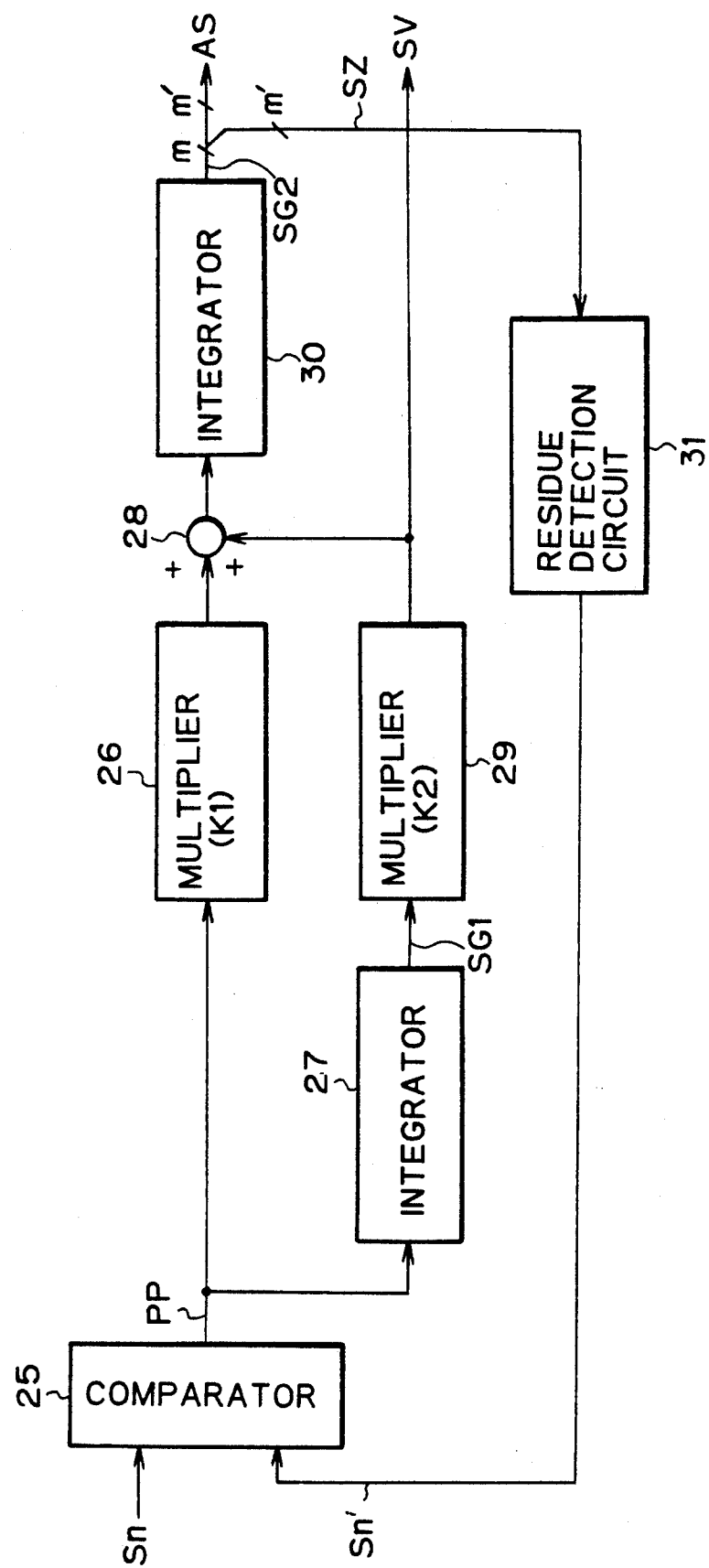
FIG. 8 is a block diagram showing an example of an address/speed detection circuit.
Figure 10:
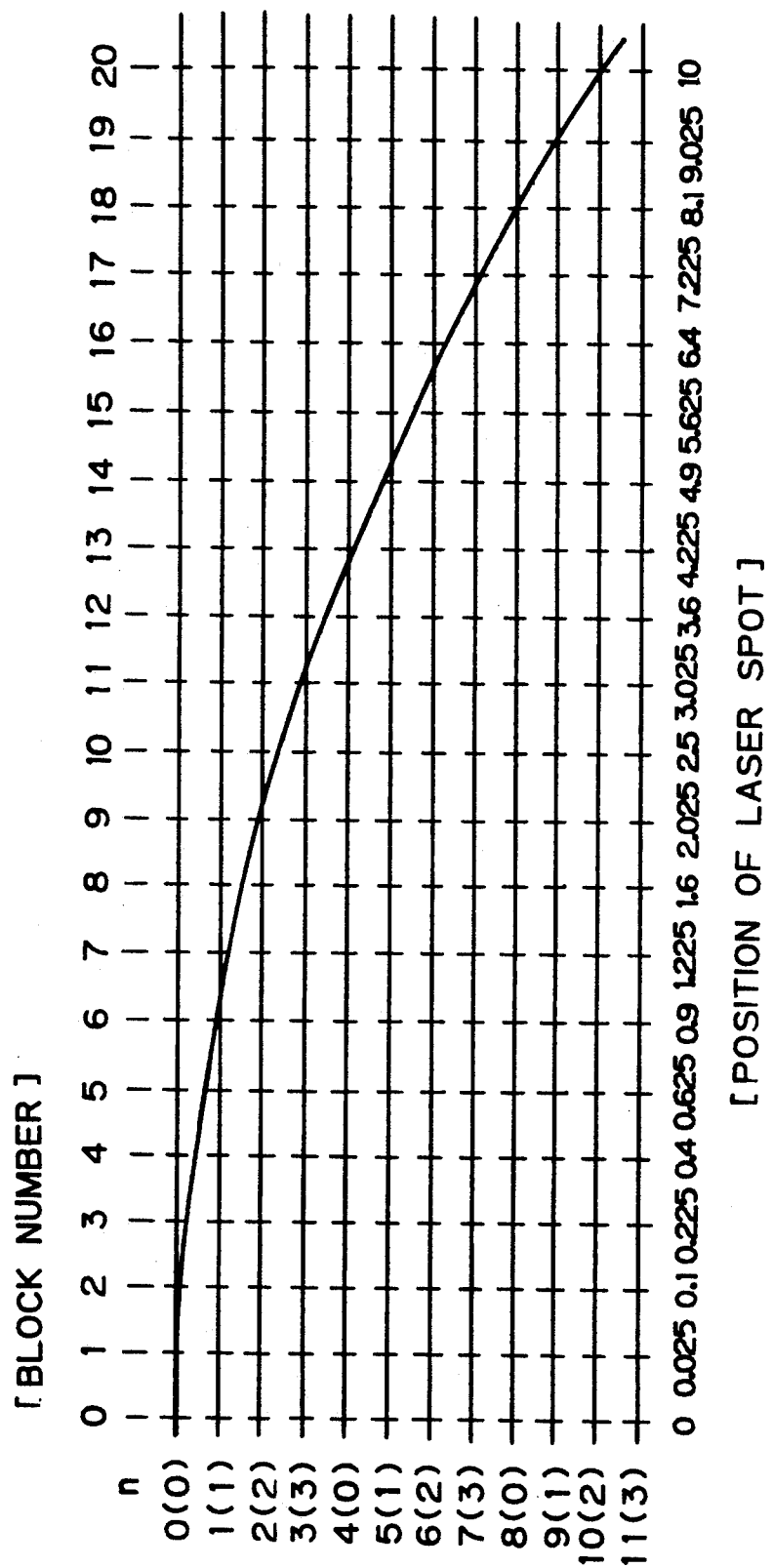
FIG. 10 is a graph plotting an example of the movement of a laser beams of optical pickup device.
Figure 11:
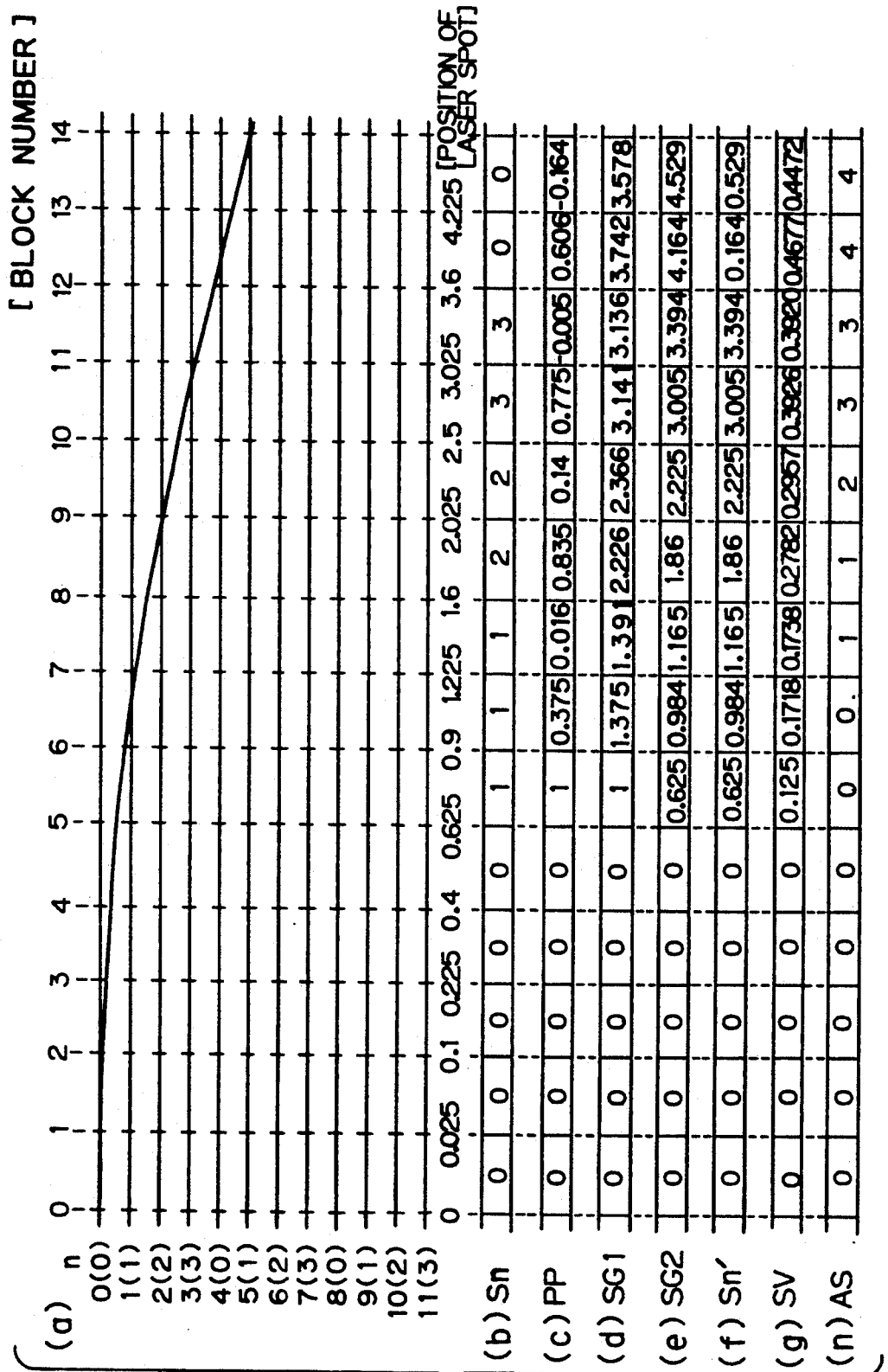
FIG. 11(a)-11(n) is a descriptive diagram of explaining operational signal waveforms for explaining the operation of an address/speed detection circuit.

FIG. 8 shows an example of an address/speed detection circuit 7.

In FIG. 8, a comparator 25 compares the value of the relative track signal Sn with that of a signal Sn'. This comparison is conducted in such an operational manner as shown in FIG. 9. The resultant signal from the comparison is inputted as a signal PP into a multiplier 26 and an integrator 27.

The multiplier 26 is to multiply the value of the inputted signal PP by a predetermined coefficient K1 (for example, 0.5), and the resulting product is inputted to an adder 28 from one of its input terminals.

The integrator 27 is to add up the value of the inputted signal PP, and the integration resultant is inputted as a signal SG1 into a multiplier 29. The multiplier 29 is to multiply the value of the inputted signal SG1 by a predetermined coefficient K2 (for example, 0.125), and the resulting product is not only inputted into the adder 28 at the other end of its input terminals, but also outputted to the next step circuit as a speed signal SV.

The adder 28 is to calculate a sum of two input signals, and the calculated resultant is inputted into an integrator 30.

The integrator 30 is to add up the signals inputted from the adder 28, with respect to the figures of the integrated value, the decimal part is defined by the effective decimal value of the integrated value, whereas the number of the figures of the integer part is set up so as to enable the integer part to represent the largest track address number of the recording track TK. The integer part, to be referred to m', of the integrated value SG2 is outputted as an address signal AS to the next step circuit. On the other hand, a value m" which is defined as the combination of the lower two digits of the integer part, and the effective decimal part, of the integrated value SG2 is inputted into a residue detection circuit 31 as a signal AZ.

The residue detection circuit 31 is to detect a residue remaining when the value of the signal SZ is divided by four, and thus detected data is outputted as a signal Sn' into the comparator 25.

In the case where the optical pick-up device 4 is moved such that, for example, the position of the laser spot formed on the optical disc moves in a constant acceleration from the block 0 of the recording track having a track address "0", in the direction along which the values of the block number and the track address become large; the speed signal SV and the address signal AS are detected in the following manner. It should be noted that in the explanation hereinafter, the internal states of all the circuits are assumed to be initialized to be 0.

Now, in this case, as shown in FIGS. 11(a) to 11(h), during the travel of the laser spot up to the block 4 (at which the displacement of the spotting position is 0.4 track), the pick-up device cannot detect the relative address n of the next recording track having a relative track address of "1", and only after the laser spot reaches block 5 (at which the displacement of the spotting position is 0.625), the component of the address pit section RA appearing in the regenerative signal RF of the optical pick-up device 4 becomes enough large, so that the value of the address pit section RA of the block 5 is detected by the relative address detection circuit 6 in the manner described above, and in accordance with the detected resultant, the value of the relative track address signal Sn is changed to be "1".

Accordingly, during the period of the movement of the laser spot to the block 4, the signals PP, SG1, SG2, Sn', SV, AS are all zero, when the laser spot reaches the block 5, the signal PP changes its value to be "1" in accordance with the change of the value of the relative track address signal Sn into "1".

Together with the changes, the integrat or 27 changes its integrated value SG1 into "1", while the multiplier 26 changes the value of its output signal into "0.5", and the multiplier 29 changes the value of its output signal into "0.125". Consequently, the adder 28 changes the value of its output signal into "0.625", and the integrator 30 changes the value of its integrated value SG into "0,625".

Following to the changes, the speed signal SV also changes its value into "0.125", while the output signal Sn' from the residue detection circuit 31 changes its value into "0.625".

When the laser spot moves to the position of the block 6 (at which the displacement of the laser spot is 0.9), the relative track address signal Sn keeps its value as it has be en, or at "1", therefore the signal PP changes its value into "0,375". This causes the integrated value SG1 of the integrator 27 to change into "1.375", changing the integrated value SG2 of the integrator 30 into "0.984". Further, the speed signal SV changes its value into "0.1718", and the output signal Sn' from the residue detection circuit 31 changes its value into "0.984", while the address signal keeps its value unchanged to be "1".

As the similar manner, after this, when the relative address detection circuit 6 detects at the block 8 (at which the laser spot is displaced by 1.6) the address pit section RA of the recording track having a track address being identified by "2", the relative track address signal Sn outputted from the relative address detection circuit 6 changes its value into "2". In accordance with this, when the optical pick-up device 4 detects the next block, namely the block 9 (at which the laser spot is displaced by 2.025), the address signal AS changes its value into "2" as the same manner described above.

After this, the similar procedures are repeated, and the address signal AS changes its value sequentially in accordance with the movement of the optical pick-up device 4.

Here, in comparing the integrated value SG2 of the integrator 30 with the real position of the laser spot, it can be understood that the integrated value SG2 varies following the real position of the laser spot.

More specifically, the relative track address signal Sn detected by the relative address detection circuit 6, corresponds to the integer part of a residue arising at the time the address of the position of the laser spot is divided by 4, whereas the signal Sn' outputted from the residue detection circuit 31 is a residue arising at the time the integrated value SG2 of the integrator 30 is divided by 4. Accordingly, the signal PP outputted from the comparator 25 is equivalent to the deviation of the integrated value SG2 of the integrator 30 form the real position of the laser spot.

Thus, in this address/speed detection circuit 7, there is provided a feedback loop which promotes the inputted relative track address signal Sn to correspond to the integrated value SG2 of the integrator 30, and consequently, the integer part of the integrated value SG2 of the integrator 30, namely the address signal AS, corresponds to the value indicating the recording track in which the laser spot is being positioned.

Meanwhile, since the integrated result of the signals each of which is inputted to the integrator 30 at every block corresponds to the position of the laser spot, the signal inputted to the integrator 30 at every block represents the number of the tracks which is crossed at a span of the block, thus corresponding to the speed of the moving laser spot. Accordingly, it is possible to use the output signal from the multiplier 29 as the speed signal SV.

Figure 12:
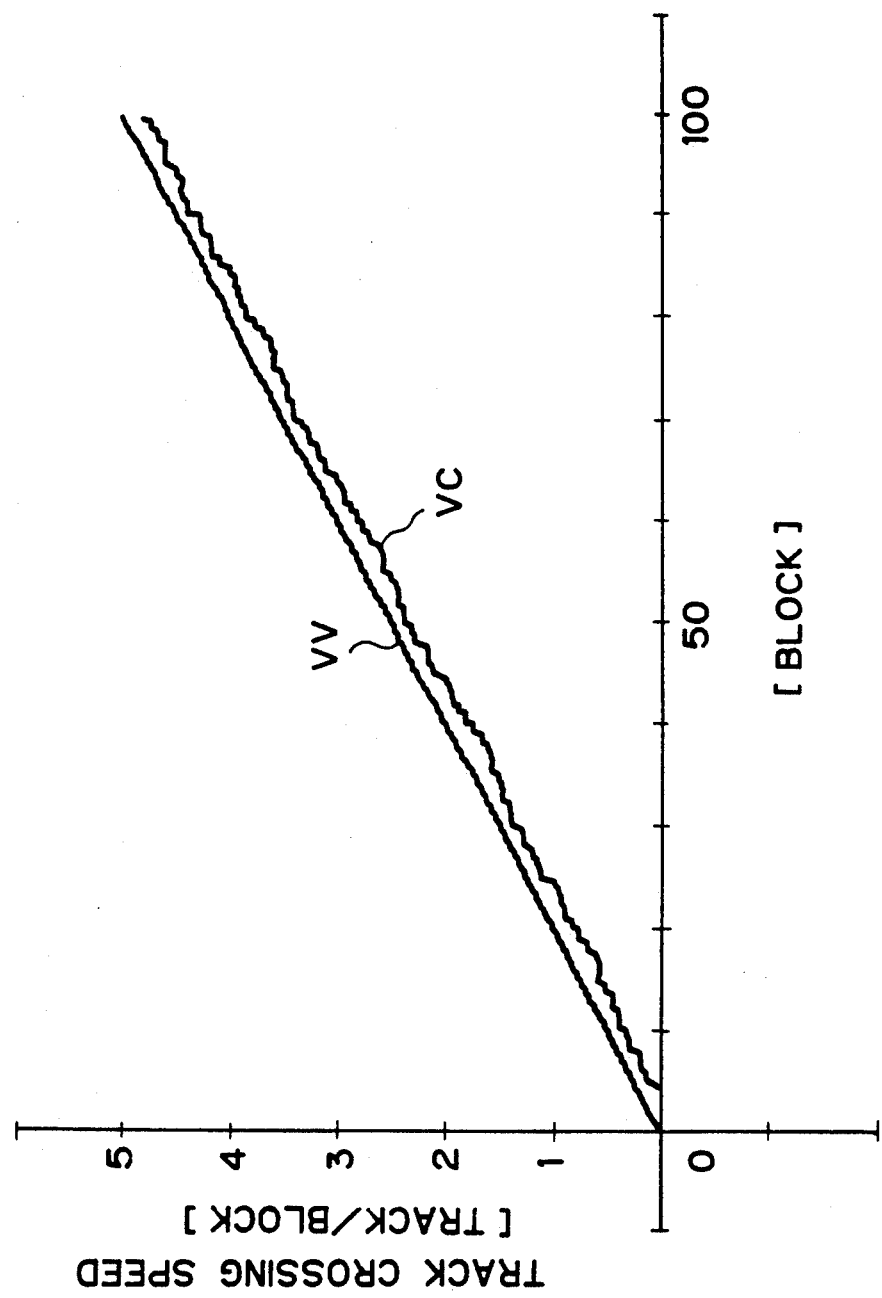
FIG. 12 is a graph showing an example of variations of the speed signal.

As an example, FIG. 12 shows a behavior of the speed signal SV compared with the real speed of the movement when the optical pick-up device 4 is driven at a constant acceleration to 100 block distance. Here the plot VV represents the variations of the real speed whereas the plot VC represents the variations of the speed signal SV.

Figure 13:
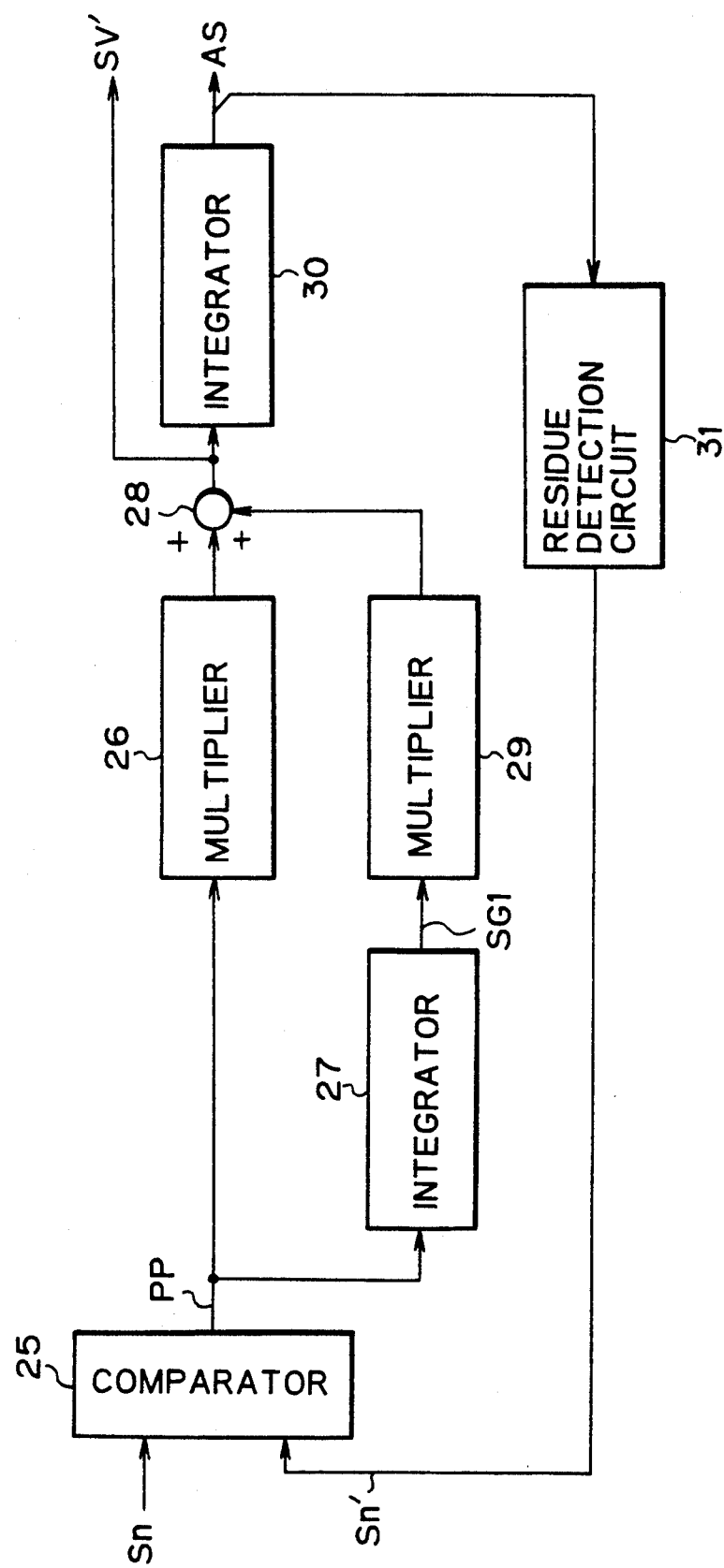
FIG. 13 is a block diagram showing another example of an address/speed detection circuit.

Further, from the fact described above, the input signal to the integrator 30 can be used as the speed signal SV. One application of the address/speed detection circuit 7 to this case is shown in FIG. 13. Here, the same reference numerals are allotted for the parts corresponding to the parts in FIG. 8.

In this case the output signal of the adder 28 is outputted to the next step circuit as the speed signal SV'.

As discussed heretofore, in this embodiment, the travel speed of the optical pickup device 4 and the address of the recording track in which the laser spot is positioned can be detected properly using the four patterns of address pit section RA.

Accordingly, it is possible to drive the optical pick-up device 4 at high speeds, with the number of the digits for the address pit section RA being reduced, thus making it possible to increase the memory capacity of the optical disc 1 and improve the data access speed.

In addition, the address/speed detection circuit 7 works as a low pass filter, so that even when there is caused a fault due to the medium defect on the magneto-optical disk 1 etc., the adverse effect can be eliminated, thus making it possible to perform a stable detection of the address.

Figure 14:
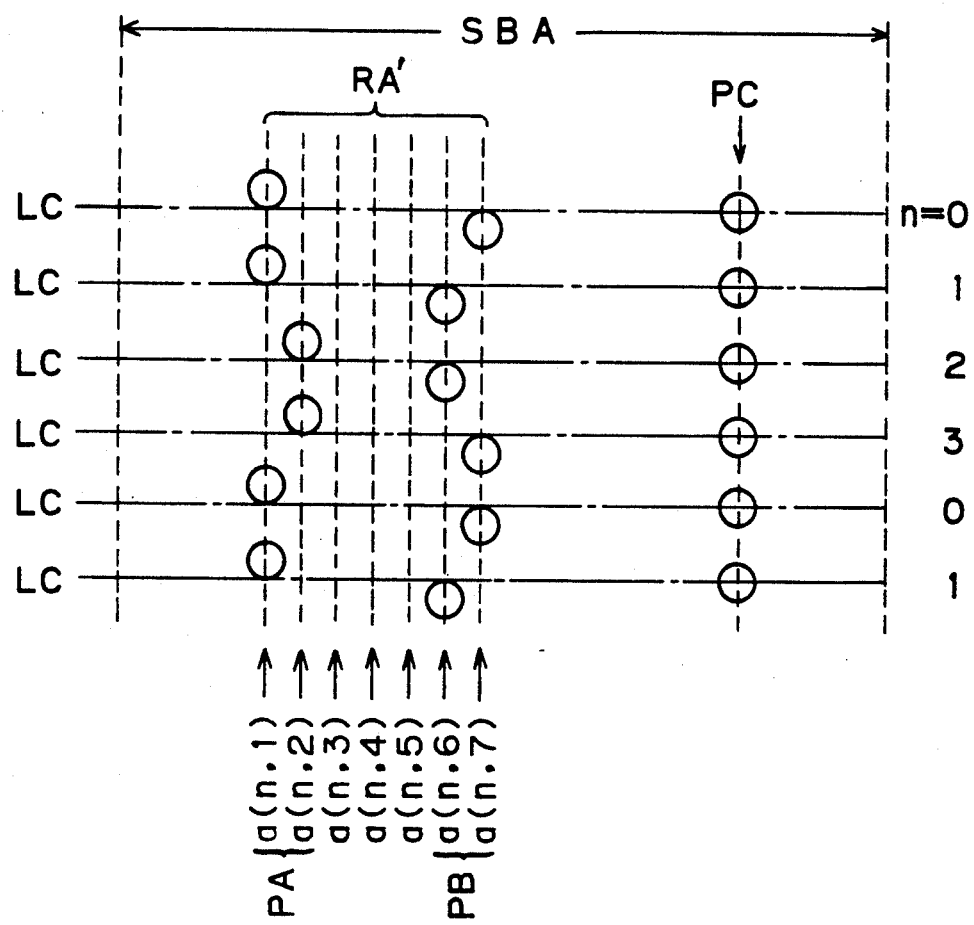
FIG. 14 is a schematic view showing another example of a servo area.

In the embodiment described above, as a servo area SBA is constructed of a wobble pit pair of PA and PB, a clock pit PC and an address pit section RA, it is also possible to use the pits in the address pit section as the wobble pit pair of PA and PB. FIG. 14 shows an example of the servo area SBA of this case.

In this case, the bit arranged in the digits a(n, 1) or a(n, 2) in the address pit section RA' plays a role as a wobble pit PA, whereas the bit arranged in the digits a(n, 6) or a (n, 7) works as a wobble pit PB.

Here, the patterns of the address pit section RA' are constructed as the same manner with the address pit section RA of the above-mentioned embodiment, therefore the relative address detection circuit 6 can be used as it is for the purpose of detecting the address pit section RA' and identifying the relative track address n.

In relation to the method for the picking up the signal components of the wobble pit pair PA and PB observed on a regenerative signal RF, after completion of detecting the address pit section RA', the maximum peak and the peak second thereto are identified among the regenerative signal RF of the address pit section RA', and the appearing orders of these peaks and the deviation of the value of the peaks are to be determined. This makes it possible to obtain the tracking error signal of the optical pick-up device 4.

Figure 15:
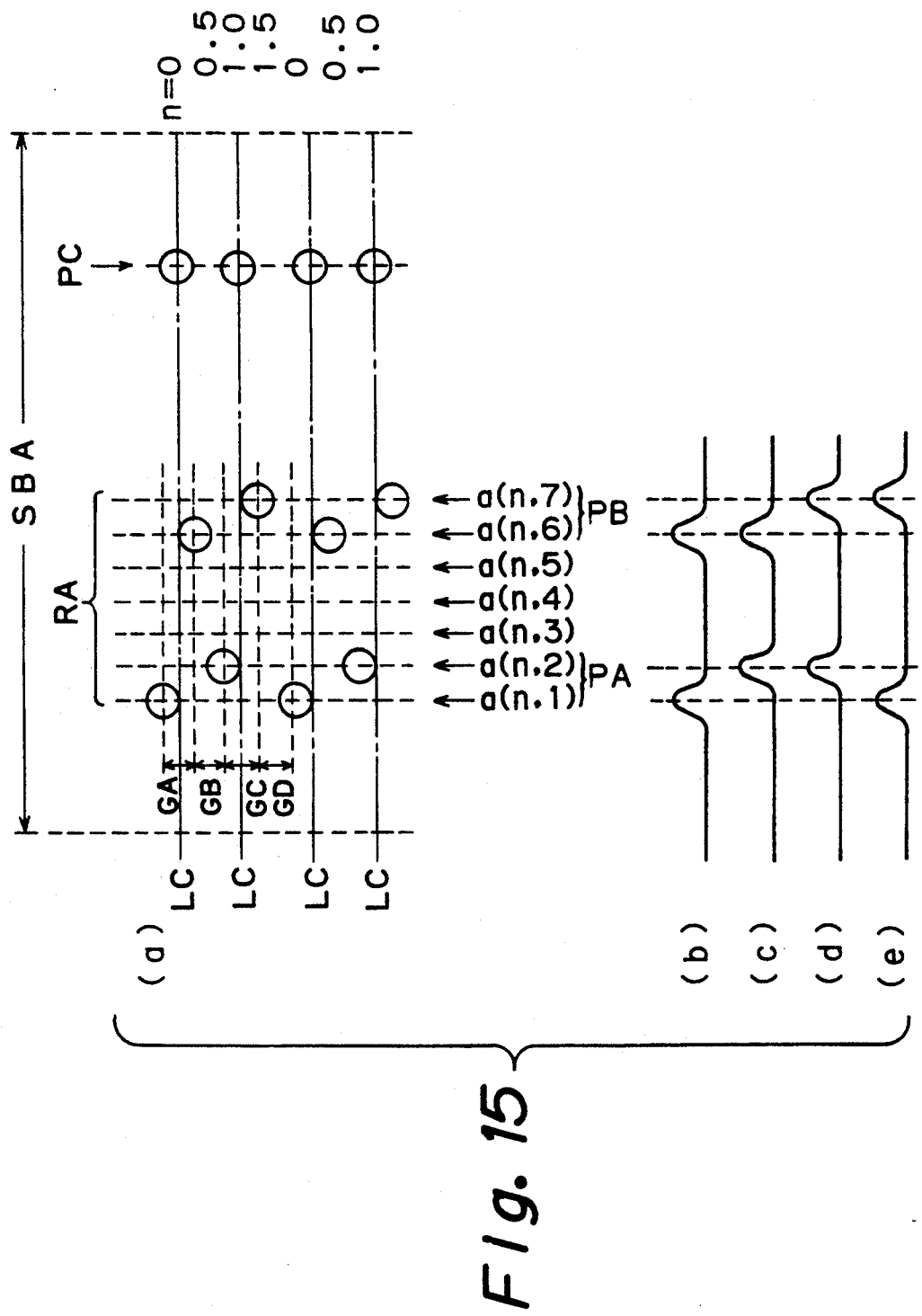
FIGS. 15(a)-15(e) is a schematic view showing still another example of a servo area.

FIG. 15(a) shows another example of the wobble pit pair PA and PB being made to serve as address pit section RA.

In this case, patterns of the address pit section RA" are constructed of two kinds. More specifically, for the pattern of the relative track address n being "0", there are set up wobble pits PA and PB at the digits a(n, 1) and a(n, 6) respectively, whereas formed are wobble pits PA and PB respectively at the digits a(n, 2) and a(n, 7) for the pattern of the relative track address n being "1".

Accordingly, when the laser spot of the optical pick-up device 4 is positioned in the region GA indicated in FIG. 15(a), the regenerative signal RF have its peaks at digits a(n, 1) and a(n, 6) as shown in FIG. 15(b) while when the laser spot is positioned in the region GB, the regenerative signal RF has its peaks at a(n, 2) and a(n, 7) as shown in FIG. 15(c). Moreover when the laser spot is positioned in the region GC, the regenerative signal RF has its peaks at digits a(n, 2) and a(n, 6), whereas when the laser spot is positioned in the region GD, the regenerative signal RF has its peaks at a(n, 1) ans a(n, 7).

Thus the position of the laser spot of the optical pick-up device 4 can be detected, in this case, with the precision of the ½ track interval. Consequently, it is possible to increase the precision in detection and diminish the component of ripple of the speed detection signal.

Meanwhile, as the embodiment described heretofore is applied to the magneto-optical disk of the present invention, the present invention can be applied in the same manner with respect to the other optical disc apparatus.

Further, in the embodiment described above, the four kinds of the address pit patterns are set up, but it is also possible to achieve the present invention in the same manner using more kinds of address pit patterns. Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disc apparatus for use with an optical disc having a plurality of recording tracks each of which is provided at predetermined intervals with pairs of servo pattern areas and data areas, said servo pattern areas being recorded with a pair of wobble pits each disposed off the center of the recording track in opposite directions, a clock pit disposed on the center of the track, and an address pit pattern consisting of a plurality of pits each of which indicates a relative track address of the recording track by using a data pattern repeated in a predetermined cycle, said optical disc apparatus comprising:
   an optical pick-up device for recording data on, and-/or regenerating data from, said optical disc;
   a relative address detection means for detecting a relative track address based on a regenerative signal from said optical pick-up device and for outputting detected relative address data; and
   an address/speed detection means for receiving said relative address data outputted by said relative address detection means, and detecting an absolute track number of the track which said optical pick-up device is accessing and a travel speed data of said optical pick-up device moving across the recording tracks,
   said address/speed detection means comprising a comparator for comparing said relative address data with a feed-back data from a residue detecting circuit and outputting an differential data, a digital data filtering means for filtering differential data and for outputting an integrator input data and a speed data, an integrator for adding up said input data to output an absolute address data, and a residue detection circuit for calculating the residue arising when the value of said absolute address data is divided by the number of said predetermined cycle of said relative address patterns and feeding its residue data back to said comparator.

2. An optical disc apparatus according to claim 1, wherein said integrator input signal is adopted as said speed signal.

3. An optical disc apparatus according to claim 1, wherein said address pit patterns is constructed by two pits each being allotted to two digits for constructing four kinds thereof.

4. An optical disc apparatus according to claim 1, wherein said address pit pattern is constructed by two pits each being allotted to two digits for constructing two kinds thereof.

5. An optical disc apparatus according to claim 3, wherein said address pits are made to serve as said wobble pit pair.

6. An optical disc apparatus according to claim 3, wherein said address pits are made to serve as said wobble pit pair and said relative address detection means is adapted to detect the position to which said optical pick-up device is accessing up to accuracy of half interval between neighboring tracks by analyzing detected relative address signal.

7. An optical disc apparatus for use with an optical disc having a plurality of recording tracks each of which is provided at predetermined intervals with pairs of servo pattern areas and data areas, said servo pattern areas being recorded with a pair of wobble pits each disposed off the center of the recording track in opposite directions, a clock pit disposed on the center of the track, and an address pit pattern consisting of two pits each of which is allotted to two digits for constructing four kinds thereof and which indicates a relative track address of the recording track by using a data pattern repeated in a predetermined cycle, said optical disc apparatus comprising:

an optical pick-up device for recording data on, and-/or regenerating data from, said optical disc;
  a relative address detection means for detecting a relative track address based on a regenerative signal from said optical pick-up device and for outputting detected relative address data; and
  an address/speed detection means for receiving said relative address data outputted by said relative address detection means, and detecting an absolute track number of the track to which said optical pick-up device is accessing and a travel speed data of said optical pick-up device moving across the recording tracks.

8. An optical disc apparatus according to claim 7, wherein said address/speed detection means comprises a comparator for comparing said relative address data with a feed-back data from a residue detecting circuit and outputting an differential data, a digital data filtering means for filtering differential data and for outputting an integrator input data and a speed data, an integrator for adding up said input data to output an absolute address data, and a residue detection circuit for calculating the residue arising when the value of said absolute address data is divided by the number of said predetermined cycle of said relative address patterns and feeding its residue data back to said comparator.

9. An optical disc apparatus according to claim 8, wherein said integrator input signal is adopted as said speed signal.

10. An optical disc apparatus according to claim 7, wherein said address pits are made to serve as said wobble pit pair.

11. An optical disc apparatus according to claim 7, wherein said address pits are made to serve as said wobble pit pair and said relative address detection means is adapted to detect the position to which said optical pick-up device is accessing up to accuracy of half interval between neighboring tracks by analyzing detected relative address signal.

12. An optical disc apparatus for use with an optical disc having a plurality of recording tracks each of which is provided at predetermined intervals with pairs of servo pattern areas and data areas, said servo pattern areas being recorded with a pair of wobble pits each disposed off the center of the recording track in opposite directions, a clock pit disposed on the center of the track, and an address pit pattern consisting of two pits each of which is allotted to two digits for constructing two kinds thereof and which indicates a relative track address of the recording track by using data pattern being repeated in a predetermined cycle, said optical disc apparatus comprising:

an optical pick-up device for recording data on, and-/or regenerating data from, said optical disc;
  a relative address detection means for detecting a relative track address based on a regenerative signal from said optical pick-up device and for outputting detected relative address data; and
  an address/speed detection means for receiving said relative address data outputted by said relative address detection means, and detecting an absolute track number of the track to which said optical pick-up device is accessing and a travel speed data of said optical pick-up device moving across the recording tracks.

13. An optical disc apparatus according to claim 12, wherein said address/speed detection means comprises a comparator for comparing said relative address data with a feed-back data from a residue detecting circuit and outputting an differential data, a digital data filtering means for filtering differential data and for outputting an integrator input data and a speed data, an integrator for adding up said input data to output an absolute address data, and a residue detection circuit for calculating the residue arising when the value of said absolute address data is divided by the number of said predetermined cycle of said relative address patterns and feeding its residue data back to said comparator.

14. An optical disc apparatus according to claim 13, wherein said integrator input signal is adopted as said speed signal.

* * * * *